United States Patent [19]
Grob

[11] Patent Number: 4,721,498
[45] Date of Patent: Jan. 26, 1988

[54] ENDLESS ELASTOMERIC DRIVE BELT

[75] Inventor: Robert J. Grob, Peoria, Ill.

[73] Assignee: Caterpillar Inc., Peoria, Ill.

[21] Appl. No.: 31,204

[22] Filed: Mar. 30, 1987

Related U.S. Application Data

[63] Continuation of Ser. No. 852,043, Apr. 14, 1986, abandoned.

[51] Int. Cl.[4] .............................................. F16G 1/12
[52] U.S. Cl. .................................... 474/261; 474/262
[58] Field of Search ................................ 474/260–262, 474/264, 268; 152/527, 534

[56] References Cited

U.S. PATENT DOCUMENTS

| | | | |
|---|---|---|---|
| 2,113,561 | 4/1938 | Freelander | 474/261 X |
| 2,260,719 | 10/1941 | Merrifield | 474/262 |
| 2,476,828 | 7/1949 | Skromme | 305/38 |
| 3,175,598 | 3/1965 | Gegnar | 152/535 |
| 3,231,000 | 1/1966 | Massoubre | 152/528 |
| 3,327,753 | 6/1967 | Travers | 152/530 |
| 3,357,470 | 12/1967 | Massoubre | 152/528 |
| 3,390,714 | 7/1968 | Marzocchi et al. | 152/527 |
| 3,426,825 | 2/1969 | Leibee | 152/527 |
| 3,498,684 | 3/1970 | Hallaman | 305/38 |
| 3,500,889 | 3/1970 | Boileau | 152/535 |
| 3,516,468 | 6/1970 | Jones | 152/528 |
| 3,583,463 | 6/1971 | O'Neil | 152/535 |
| 3,589,424 | 6/1971 | Sasaki et al. | 152/530 X |
| 3,643,723 | 2/1972 | Mukai et al. | 152/527 |
| 3,772,130 | 11/1973 | M̶ ̶ ̶ ̶ ̶ | 474/262 X |
| 3,858,948 | 1/1⁓ | | |
| 3,863,515 | 2/1975 | Meadows | 474/262 |
| 3,911,755 | 10/1975 | Vance, Sr. | 474/262 |
| 3,945,422 | 3/1976 | Pottinger | 152/527 |
| 4,016,916 | 4/1977 | Ravagnani | 152/534 |

FOREIGN PATENT DOCUMENTS 0426684 4/1935 United Kingdom ................ 474/262

OTHER PUBLICATIONS

Sae Article 760,731, Dated Feb. 23–27, 1976; By M. G. Pottinger.

Primary Examiner—Stephen J. Novosad
Assistant Examiner—Thuy M. Bui
Attorney, Agent, or Firm—Charles E. Lanchantin, Jr.

[57] ABSTRACT

An endless elastomeric or rubber drive belt includes a body having a mid-circumferential plane and first, second and third ply portions of reinforcement therein. The first ply portion has first cable means oriented substantially parallel to the mid-circumferential plane for carrying tensile loads and defining a second plane contiguous therewith. The second ply portion has second cable means arranged on a positive bias angle and the third ply portion has third cable means arranged on a negative bias angle to the mid-circumferential plane. The second and third ply portions are juxtaposed and constructed differently so as to substantially neutralize the shear stresses in each generated from tensile loading while bending by apportioning their strain levels in approximate proportion to their distances from the second plane.

16 Claims, 9 Drawing Figures

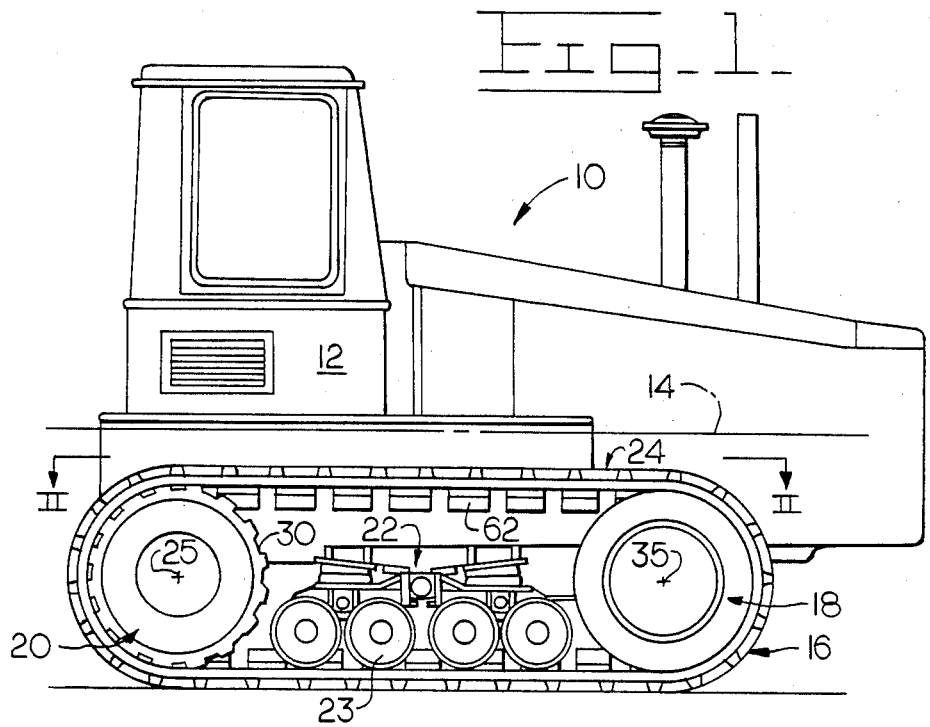
Fig_1_
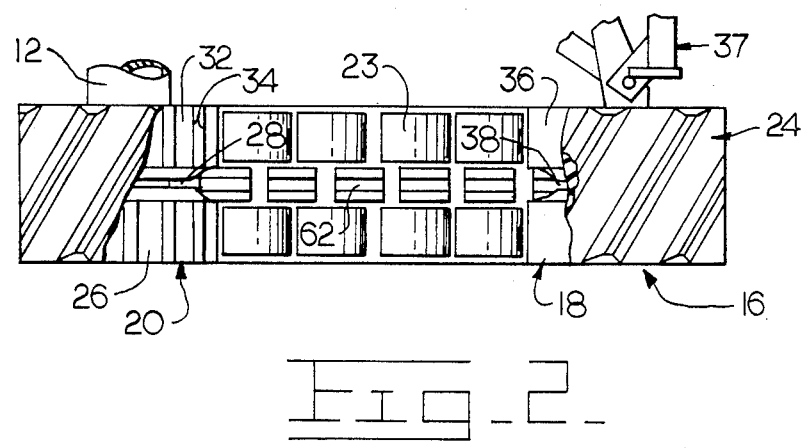
Fig_2_

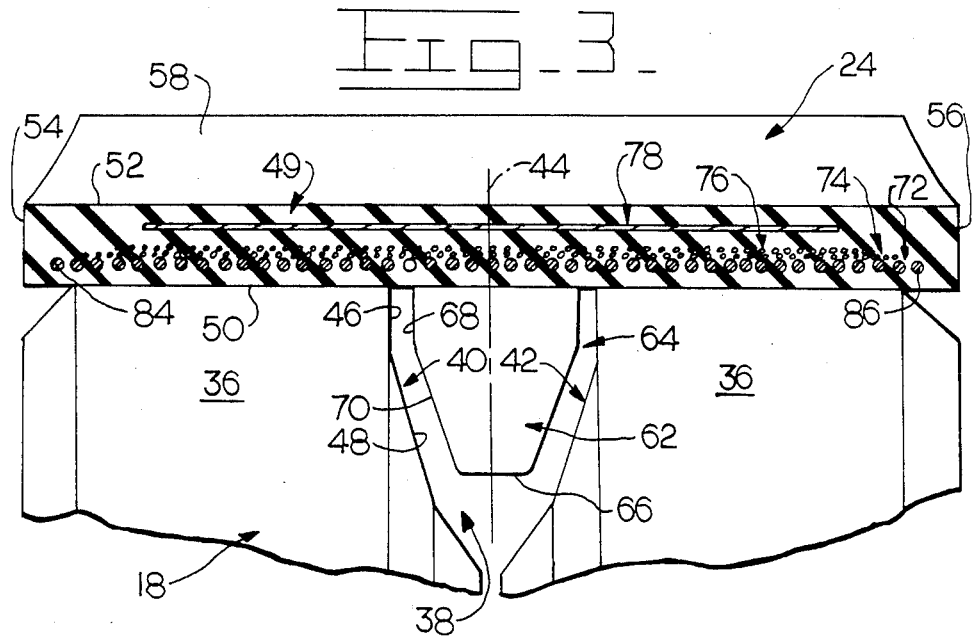
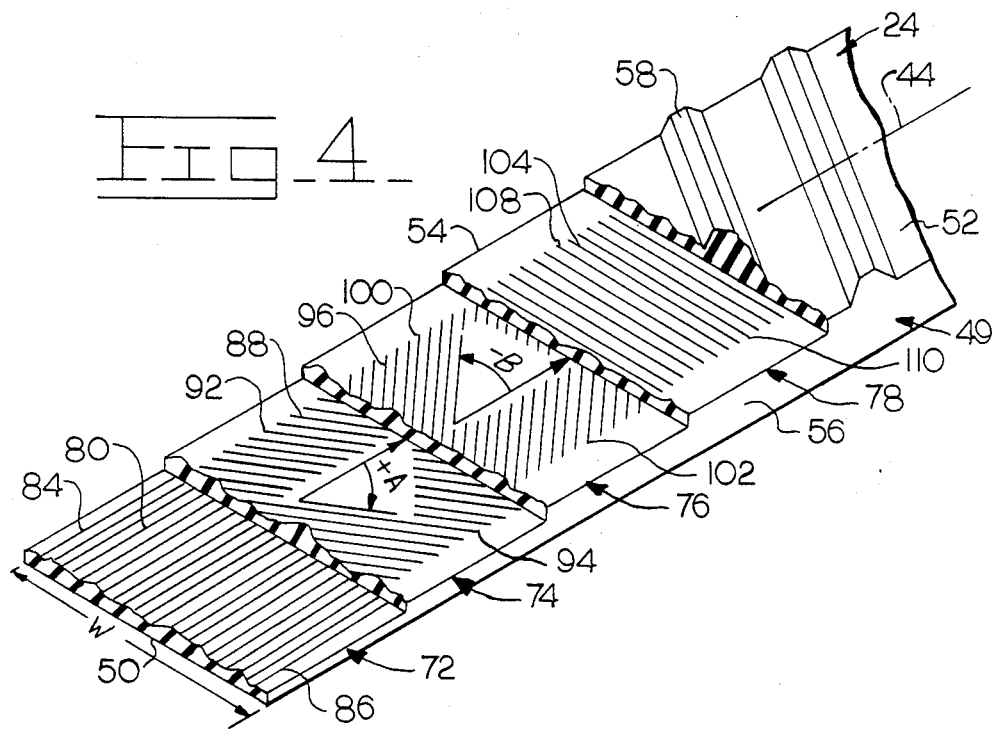

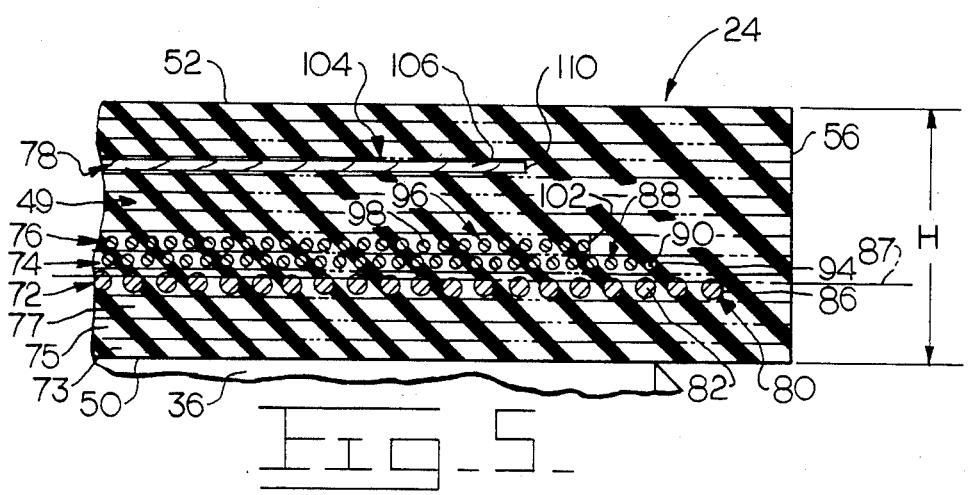
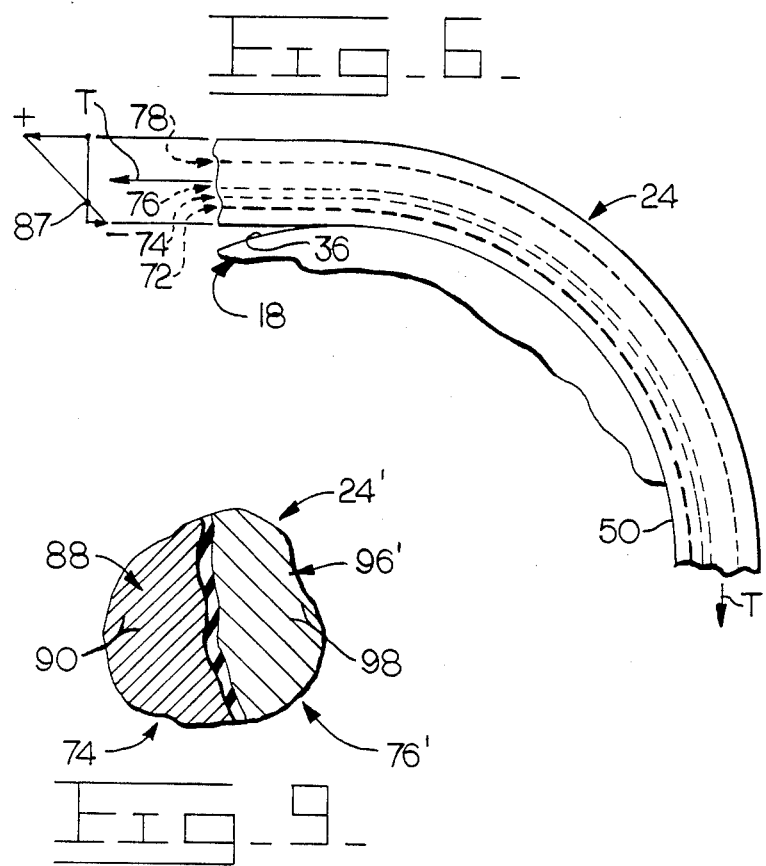

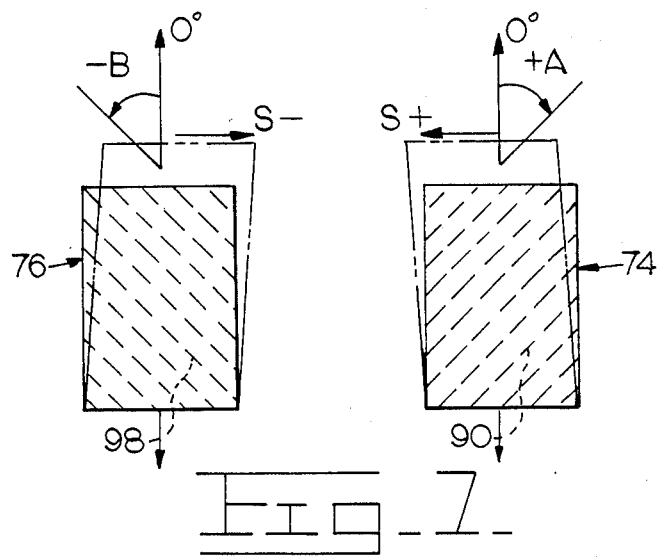
Fig_7_
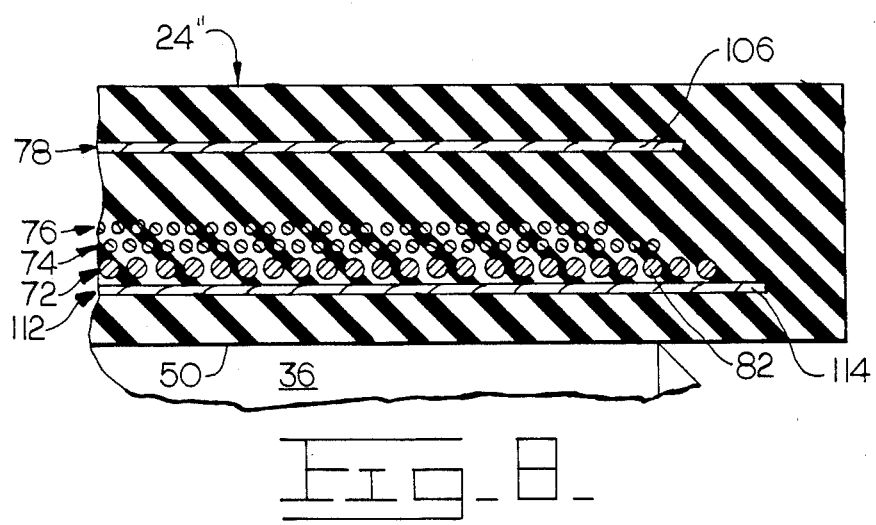
Fig_8_

ENDLESS ELASTOMERIC DRIVE BELT

This is a continuation of Ser. No. 852,043 filed Apr. 14, 1986, now abandoned.

TECHNICAL FIELD

This invention relates to an endless drive belt for operation about a pair of wheel structures, and more particularly to an elastomeric drive belt for a vehicle having improved internal reinforcement for providing the desired stiffness while minimizing lateral shifting of the belt to one side.

BACKGROUND ART

In order to avoid the disadvantages of conventional multi-jointed and metallic track chains for vehicles, an increasing amount of developmental effort has been directed to utilizing a continuous elastomeric or rubber belt entrained about a pair of longitudinally spaced wheels for propulsion and support. Positive drive between one wheel and the belt has also been heretofore preferred because driving the belt solely by friction requires a substantial area of angular contact or wrap about the driving wheel and a fairly high level of relatively constant tension of the belt. Unfortunately, prior systems of positive drive have unduly complicated the structure of the belt and have provided undesirable stress risers in the belt that greatly limit the service life thereof. Specifically, a plurality of holes rods, metallic elements or the like have usually been required in the belt for positively coupling with the protruding lugs on the drive wheel. On the other hand, a primarily friction-driven belt is highly desirable because there can be flew if any interruptions in the reinforcing plies used to transmit the desired tension and to provide the desired degrees of stiffness and structural integrity to the belt.

In high speed and heavy duty agricultural, earthmoving, and military applications, the demands upon such a belt are particularly great. While each belt must transmit a relatively large tension load sufficient to substantially eliminate slip between the driving wheel and the frictionally driven belt, it must simultaneously be circumferentially flexible to allow it to maintain compliance with uneven terrain. In the lateral direction, it should have a longitudinal stiffness sufficient for minimizing deflection or snaking thereof when obstacles are encountered and to better mate with the wheels. Lastly, in the transverse direction of its cross section, it should be resistant to bending.

U.S. Pat. No. 3,498,684 issued Mar. 3, 1970 to A. D. Hallaman illustrates one traction belt that recognized and attempted to overcome some of these problems. That disclosure taught a belt having spaced apart tension members in the form of longitudinally oriented and relatively inextensible textile cords or stranded steel wire, and transversely oriented reinforcing members of stranded steel wire on opposite sides of the tension members. However, the continuity of the belt was undesirably interrupted with penetrating apertures for receiving sprocket teeth and the belt was not constructed to resist oblique loads.

An earlier belt is illustrated in U.S. Pat. No. 2,476,828 issued July 19, 1949 to A. B. Skromme which desirably had no interruptions and three layers of reinforcement to provide the desired circumferential, longitudinal, and lateral stiffness characteristics. Specifically, it provided an outer first ply portion consisting of a generally circumferentially extending cable, an adjacent and intermediate second ply portion of parallel wire cables at a preselected inclined angle, and an inner third ply portion of parallel wire cables at a preselected inclined angle with the longitudinal plane of the belt and at an opposite and equal angle with the wire cables in the second ply portion. The juxtaposed second and third biased ply portions that reinforced the elastomeric material of the belt and served to resist deflection thereof by transversely directed forces at various angular attitudes was a substantial feature of U.S. Pat. No. 2,476,828.

Unfortunately, when belts having a circumferentially extending ply portion and oppositely biased ply portions of similar construction are operated under high tension loads and at high speeds in a bending mode about the wheel structures, the angled plies undesirably cause lateral shifting of the belts to one side. In other words, the belts have a tendency to move laterally or to drift in use away from a mid-circumferential plane and this causes undesirable friction against the belt guides and a buildup of heat that reduces belt service life.

Pneumatic tires have heretofore included biased breaker ply portions outwardly of one or more carcass ply portions and having various widths and various angular attitudes of the parallel cords or wires. Unfortunately, as the tire deforms in the "footprint" region, stresses arise as a result of the biased cords that have a transverse component. Such tires therefor exhibit unequal wear and want to steer to one side. U.S. Pat. No. 3,175,598 issued Mar. 30, 1965 to A. Cegnar discloses a tire with an outer breaker portion having a narrower width than an underlying breaker portion, and a modification wherein the inclination angle of the wires of the outer breaker portion should be less than 30° and be less in magnitude than the inclination angle of the wires of the underlying breaker portion. U.S. Pat. No. 3,357,470 issued Dec. 12, 1967 to J. Massoubre teaches use of tire crown reinforcement having cables in at least two adjacent ply portions which are angularly related in accordance with a specific mathematical equation so that the stresses developed are such as to be directed perpendicular to the cords of the plies to eliminate shearing stresses. However, when the mathematical methods used to solve these pneumatic tire deformation problems are applied to an endless vehicle drive belt, the theoretical results are unsatisfactory. Particularly, it is believed that the drive belts would exhibit at least as much tendency to drift laterally as existing belts, and in many cases the drift would be worse. It is apparent that the approach for designing the ply portions of a pneumatic tire are simply not directly applicable to a vehicular drive belt. On the one hand, solely rotatable pneumatic tires have a conventional horseshoe-shaped cross section and must provide a resiliently soft ride by a relatively flexible arrangement of elastic cords, many of which are in anchored carcass plies. On the other hand, vehicular drive belts preferably have a rectangular cross section, and are subjected to relatively high tension loads and transverse side loads when maneuvering. Such drive belts also extend between two or more wheel structures, and are usually wider than the wheel structures to minimize compaction of the earth and to provide the desired drawbar pull characteristics.

Accordingly, what is needed is an economical and reliable endless elastomeric or rubber drive belt of simple construction that will employ internal reinforcement in the form of breaker layers and/or ply portions so constructed and arranged as to provide the desired circumferential, longitudinal, lateral and oblique strength characteristics while simultaneously minimizing any self tendency thereof to shift laterally in use during bending about two or more wheel structures. Preferably, the belt thus provided should have a minimum number of uninterrupted ply portions and a relatively uniform cross sectional shape about its circumference.

The present invention is directed to overcoming one or more of the problems as set forth above.

DISCLOSURE OF THE INVENTION

In accordance with one aspect of the present invention, an elastomeric drive belt has an endless body having an interior surface and a longitudinal first plane therethrough, with three ply portions of structural reinforcement therein. A first ply portion has first cable means for sustaining tension loads including at least one cable oriented in substantially parallel relation to the first plane, and the first cable means has a second plane substantially contiguous with the cable parallel to the interior surface. A second ply portion has second cable means arranged at a positive bias angle to the first plane and defining in use a first shear stress and first strain level, and a third ply portion has third cable means arranged at a negative bias angle to the first plane and defining in use a second shear stress and second strain level. Advantageously, the second and third ply portions are constructed differently so as to substantially neutralize the first and second shear stresses generated from tensile loading of the belt while bending by apportioning the first and second strain levels in approximate proportion to the distance of the first and second cable means from the second plane.

In accordance with another aspect of the present invention, an endless elastomeric drive belt has a belt body defining an interior surface and a mid-circumferential plane therethrough, with three ply portions of structural reinforcement. A first ply portion has first cable means for sustaining tensile loads including at least one cable oriented substantially parallel to the plane outwardly of the interior surface, a second ply portion has second cable means outwardly of the first ply portion including a plurality of second cables oriented at a preselected angle A to the plane, and a third ply portion has third cable means outwardly of the second ply portion including a plurality of third cables oriented at a preselected angle B greater than angle A and of opposite sign relative to the plane so that the shear stresses generated from tensile loading of the belt while bending are substantially neutralized and any tendency of the belt to shift laterally is minimized.

BRIEF DESCRIPTION OF THE DRAWINGS

FIG. 1 is a diagrammatic side elevational view of a work vehicle employing the endless elastomeric drive belt of the present invention.

FIG. 2 is a plan view of the drive belt portion of FIG. 1 taken along line II—II thereof, with the upper central section of the belt broken away to better illustrate the external construction of the wheel structures, the roller support mechanism, and the belt alignment members.

FIG. 3 is a diagrammatic and enlarged elevational view of a wheel structure and its engaged relationship with a cross sectional view of the drive belt of FIGS. 1 and 2.

FIG. 4 is a perspective view of the drive belt of FIGS. 1-3 with the ply portions broken away in layers to show certain details of construction thereof.

FIG. 5 is an enlarged partial transverse section of the drive belt of FIGS. 1-4 showing dimensional relationships between the ply portions and the external surfaces of the belt.

FIG. 6 is a fragmentary side elevational view of the drive belt of FIGS. 1-5 in partial wrapping engagement with a wheel structure with the thickness distorted out of scale to better illustrated details of construction thereof with respect to an associated theoretical strain diagram projected outwardly of the drive belt.

FIG. 7 is a schematic view of two angled ply portions that must be arranged in an opposing relation and constructed in accordance with the drive belt of the present invention so that the deformed shape thereof shown in phantom will result in the sum of the shear stresses being substantially zero.

FIG. 8 is a view similar to FIG. 5 of a second alternate embodiment of the instant drive belt.

FIG. 9 is a fragmentary and pictorial view of the juxtaposed breaker portions of a first alternate embodiment drive belt.

DESCRIPTION OF THE PREFERRED EMBODIMENT

FIG. 1 illustrates an exemplary work vehicle 10 for agricultural or earthmoving use which has a chassis or main frame 12 with a longitudinal axis 14. A propulsion system 16 resides generally beneath the frame at the laterally opposite sides thereof, as representatively shown in FIG. 2, and includes at each side a front idler wheel structure 18, a rear driver wheel structure 20, a roller support mechanism 22 having a plurality of rollers 23, and an endless elastomeric drive belt 24 entrained about the wheel structures and roller support mechanism which is constructed in accordance with the present invention. The endless characteristic of the drive belt 24 means that the belt is continuous about its periphery or is of closed loop form, and desirably has no connection joint(s).

The rear driver wheel structure 20 frictionally transmits power to the drive belt 24 and has a fixed axis 25 and a relatively rigid and radially outwardly facing peripheral surface 26 of substantially cylindrical configuration divided in two by a circumferential guide channel 28 as shown in FIG. 2. A plurality of peripherally spaced and laterally extending grooves 30 are provided in the driver wheel structure which form a corresponding plurality of upraised lugs 32 defining relatively sharp and substantially straight leading and trailing edges 34. In the event of the intrusion of mud or the like between the driver wheel structure and the belt, the mud can be squeezed into the grooves and laterally outwardly away from the interface. Moreover, the driver wheel structure can limitedly rotate relative to the belt sufficient to cause these leading edges and juxtaposed walls to wipe such material from the belt into the grooves where it can be urged laterally outwardly.

The front idler wheel structure 18 has a movable axis 35 and support and loading means 37, only partially shown in FIG. 2, for continually urging the idler wheel structure longitudinally forwardly or to the right when viewing the drawings to maintain a relatively high and constant tension level upon the drive belt 24 and to controllably recoil or move rearwardly for adsorbing energy when a sizable object finds its way between the belt and wheel structure or when the front of the belt contacts an obstacle. The front idler wheel structure also has a relatively rigid and radially outwardly facing peripheral surface 36 of substantially cylindrical shape divided in two by a circumferential guide channel 38, but in this embodiment has no equivalent to the grooves 30 at the rear. The annular front and rear guide channels 38 and 28 are similar peripherally in cross sectional shape, and this shape may be noted by reference to FIG. 3 showing the front idler wheel structure in transverse elevation. Each of the guide channels is bounded by laterally inner and outer positioning surfaces 40 and 42 respectively defined by the wheel structure. These surfaces are symmetrically arranged with respect to a mid-circumferential plane or longitudinal and vertically oriented first plane 44, and each has a radially outer surface of revolution 46 and radially inner surface of revolution 48 which have respective angles of inclination of approximately 90° and 106°, respectively relative to a plane tangent to the exterior surface 36 in cross section.

Turning now to the construction of the drive belt 24 as best illustrated in FIGS. 3, 4 and 5, it can be noted to include an endless band type belt body 49 formed into a closed loop and having a relatively flat interior surface 50, a relatively flat exterior surface 52, and opposite inner and outer side surfaces 54 and 56 respectively to define a generally uniform rectangular cross sectional configuration about its periphery which is preferably bisected by the mid-circumferential plane 44. The interior and exterior surfaces 50 and 52 are preferably perpendicular to this plane and are relatively flat when extending longitudinally between the wheel structures 18 and 20, and are semicylindrical in shape when passing peripherally about them. A plurality of ground engaging cleats or grousers 58 extend outwardly from the exterior surface of the body and are preferably integrally formed with the elastomeric material of the belt body for penetrating the earth and enhancing the tractive capability of the vehicle 10. The elastomeric or rubber-like character of the cleats permits the illustrated work vehicle to travel over improved road surfaces without damage thereto. The cleats 58 are substantially straight and inclined at a preselected angle with respect to the mid-circumferential plane 44 for improved traction and for urging mud or the like laterally away from the belt. However, it can be appreciated that the cleats can be of almost any form.

Referring to FIGS. 2 & 3, a plurality of lateral alignment members or guide blocks 62 extend inwardly from the interior surface 50 and are preferably integrally formed with the elastomeric material of the belt body 49 for registry with the wheel guide channels 28 and 38 on the rear and front wheel structures 20 and 18, respectively. These guide blocks are circumferentially separated a relatively limited distance, for example about 5 cm (2"), and each one has symmetrically opposite side locating surfaces 64 and a tip surface 66. Each locating surface 64, includes a base portion 68 and a contiguous radially inner portion 70 having exemplary angles of inclination of approximately 94° and 110° relative to the relatively flat interior surface 50.

As best shown in FIG. 4, the drive belt 24 has first, second, third and fourth ply portions or layered reinforcement portions 72, 74, 76 and 78 respectively arranged in serial relation from the interior surface 50 to the exterior surface 52. The drive belt is preferably built up by depositing a plurality of individually constructed layers of uncured elastomeric or rubber material and uncured elastomeric or rubber material with reinforcement therein on a large cylindrical drum, not shown. In the instant example, the first ply portion 72 is displaced from the interior surface 50 by three of such unreinforced layers such as shown at 73, 75 and 77 in FIG. 5 in order to provide the desired protection thereof in a work vehicle. As illustrated in FIG. 5, the drive belt has 13 layers prior to curing of the material by heated water and/or steam in a pressurized vessel such as a hydroclave or the like as is schematically shown by the phantom lines designating the various layers.

The first ply portion 72 includes first cable means 80 circumferentially oriented substantially parallel to the mid-circumferential plane 44 outwardly of the interior surface 50. Such cable means includes at least one relatively inextensible reinforcing steel cable 82 spirally wrapped longitudinally in the body 49 from a first lateral edge 84 to a second lateral edge 86 spaced away from the sides 54 and 56 as is shown in FIGS. 4 and 5. This cable means is constructed to carry substantially all of the tensile working load of the drive belt 24 and, accordingly, the cable is of generous cross section so that this layer is thicker than the remaining layers. For example, one such cable 82 is of conventional wound, multi-stranded steel wire construction having a diameter of approximately 4.42 mm (0.174") and a density of 1.85 ends per cm (4.7 ends per inch). Such cable is actually made up of 7 bundles of 7 twisted fine gauge steel filaments, with each filament being of about 0.30 mm (0.012") diameter. A second plane 87, shown in phantom in FIG. 5, is parallel to the interior and exterior surfaces 50,52 of the cross section of the belt body 49 and is normal to the first plane 44, and is also substantially contiguous with and defined by the first cable means 80. By the term "contiguous", it is meant that the second plane 87 passes through the tension-resisting cable means 80 as is illustrated or is relatively close thereto.

The second ply portion 74 is preferably near to or immediately outwardly of the first ply portion 72. It includes second cable means 88 in the form of a plurality of parallel steel breaker cables 90 extending on the bias between lateral edges 92 and 94 spaced further away from the belt sides 54 and 56 than the lateral edges 84 and 86 of the first ply portion 72. Each of the breaker cables 90 is of conventional wound, multi-stranded steel wire construction also. One such breaker cable has a diameter of approximately 1.19 mm (0.047") and a density of 2.76 ends per cm (7.0 ends per inch). The breaker cable is actually made up of 6 of the previously noted fine guage steel filaments twisted together. In the instant example, the angle of the bias breaker cables, identified as angle A in FIG. 4, is +45° from the mid-circumferential plane 44. This angle is identified as being positive, but this is an arbitrary convention.

The third ply portion 76 is immediately adjacent to and outwardly of the second ply portion 74 and includes third cable means 96 having a plurality of parallel steel breaker cables 98 extending on the bias between lateral edges 100 and 102 spaced further away from the belt sides 54 and 56 than the lateral edges of the second ply portion 74. Each of the breaker cables 98 is preferably identical to each of the breaker cables 90 of the second ply portion, but the bias angle thereof, identified as angle B in FIG. 4, is about −60° relative to the mid-circumferential plane 44 and of an opposite direction from the angle A as can be seen from the drawing.

Lastly, the fourth ply portion 78 includes fourth cable means 104 having a plurality of parallel steel cables 106 extending transversely between lateral edges 108 and 110 spaced further away from the belt sides 54 and 56 than the edges 100 and 102 of the third ply portion 76. Each of the cables 106 is preferably identical in construction to the breaker cables 90 and 98 and is arranged at an angle of 90° to the mid-circumferential plane 44 of the drive belt 24 as is schematically illustrated. The fourth ply portion 78 can be spaced away from the third ply portion 76 by several layers of solely elastomeric material as is shown in FIG. 5, and can likewise be spaced away from the exterior surface 52 by several layes. This fourth ply portion serves to particularly resist bending of the drive belt 24 in the transverse direction of its cross section.

As representatively shown in FIG. 3, the lateral edges 84 and 86 of the first ply portion 72 are preferably located laterally outwardly beyond the outer edges of the peripheral surface 36 of the wheel structure 18 to better resist severe load applications at the outer edges of the belt 24 and crack propagation in the body 49 thereat. The successive ply portions 74, 76 and 78 are stepped back away from the sides 54 and 56 of the belt as the ply portions approach the exterior surface 52 to avoid stress risers otherwise eminating from the alignment of the lateral edges or ends of the cables.

One of the drive belts 24 has an overall width W of approximately 40.5 cm (16"), an overall height H of about 3.75 cm (1.48"), and is capable of sustaining tension loads of 31,290 Newtons per lateral centimeter of belt width. Another drive belt 24 has an overall width of about 62 cm (24.4"), an overall height H of approximately 3.70 cm (1.45"), and is capable of sustaining tension loads of 23,300 Newtons per lateral centimeter of belt width. Thus, a relatively broad range of tension sustaining capability of from about 10,000 to 40,000 Newtons per lateral centimeter of belt width can be expected utilizing the ply portions 72, 74 and 76 of the present invention. A preferred range, however, is from about 20,000 to 32,000 Newtons per lateral centimeter of belt width.

FIRST ALTERNATE EMBODIMENT

Whereas the embodiment of the drive belt 24 illustrated in FIGS. 3-5 has unequal cable angles for the bias ply portions 74 and 76 and similar density levels for the cables 90 and 98, it is contemplated that these ply portions can be modified to have the same angles of the bias breaker cables but unequal density levels. In FIG. 9, the first alternate embodiment drive belt 24' has a second portion 74 substantially similar to FIGS. 3-5 with the second cable means 88 including cables 90 oriented at a bias angle of approximately +45°. However, the third ply portion 76' thereof has third cable means 96' including cables 98 arranged at the same bias angle of approximately −45°. The only difference between these breaker layers is that there are fewer of he cables 98 per centimeter than there are of cables 90 per centimeter for reasons that will be later explained. The remainder of the belt can be similar to that of FIGS. 3-5.

SECOND ALTERNATE EMBODIMENT

The width W of the drive belt 24 can also be increased for greater flotation of the work vehicle 10. But in such instance, it might be necessary to increase the transverse stiffness of the belt by increasing the size or density of the cables 90, 98 and 106, for example. In other instances, such as when using the vehicle in a logging application, the footing conditions might dictate that a fifth ply portion 112 similar to fourth ply portion 78 should be added to the belt between the first ply portion 72 and the interior surface 50 to greatly increase its transverse stiffness and service life as illustrated in FIG. 8. In such alternate drive belt 24" the same reference numbers have been used to correspond with similar elements in the embodiment of FIG. 5. Note that in FIG. 8, the 90° cables 106 of the fourth ply portion 78 extend laterally outwardly further than those of FIG. 5. Moreover, the added fifth ply portion 112 has a plurality of cables 114 also arranged at an angle of 90° to the mid-circumferential plane that extend laterally outwardly beyond the 0° cables 82 and the 90° cables 106.

INDUSTRIAL APPLICABILITY

Biased ply portions 74 and 76 containing parallel cables 90 and 98 at a substantial range of bias angles between 0° and 90° can be placed in the drive belt 24 to increase the circumferential, longitudinal, transverse and oblique stiffness thereof. They are subjected to a strain or are stretched while bendably passing over the front and rear wheel structures 18 and 20 in rough proportion to the distance of each away from the plane 87 contiguous with the substantially inextensible first ply portion 72. This is because the belt typically can experience relatively high tensile forces T of more than 66,750N (15,000 lbs.) which are approximately half of the gross weight of the work vehicle 10. This can be appreciated by reference to FIG. 6. A shear strain results from the stretching of each one of the bias ply portions 74 and 76 as it bends around the wheel structure, and this causes each incremental rectangular section thereof to distort to a substantially parallelogram shape when developed as may be appreciated by comparing the solid and phantom line schematics in FIG. 7. Note that the high tensile forces and cylindrical wheel surfaces 26 and 36 act to prevent twisting of these incremental sections. The affect is reduced to some degree by placing the two bias ply portions in close proximity to each other immediately adjacent the first ply portion 72 with its essentially 0° orientation. Nevertheless, if the ply portions 74 and 76 were similar in construction and opposed at the same 45° angular magnitude, the result would still be unsatisfactory in that the drive belt would want to move laterally against the wheel structures 18 and 20 or against the rollers 23 of the roller support mechanism 22. Specifically, as can be noted by reference to FIG. 3, the laterally outer surfaces 64 of the guide blocks 62 could contact the surfaces 42 of the front idler wheel structure 18 in one direction of longitudinal movement of the work vehicle 10. In the reverse direction of travel of the vehicle, the laterally inner guide locating surfaces 64 could contact the positioning surfaces 40. This would cause rubbing and undesirable heating of the belt.

In accordance with the present invention, the bias angles A and B of the ply portions 74 and 76 are preferably made to be different by a preselected degree to specifically balance, neutralize, or cancel out such shear stresses, or alternatively the number or density of the cables 90 and 98 are tailored to be different by a preselected amount to neutralize such shear stresses with the same bias angles A and B. Preferably, the angles rather than cable density are varied.

Each of the bias ply portions 74 and 76 has a different applied strain which is primarily a function of the distance of the layers thereof from the second or neutral plane 87 of the belt as can be visualized by noting the theoretical strain diagram in FIG. 6 which does not take into account the influence on this diagram of the fourth ply portion 78. The applied strain is secondarily a function of the belt curvature as it circumnavigates the supporting wheel structures to the belt diameter in its originally manufactured and cured form, but this can be disregarded for approximation purposes. For rough calculations, the neutral plane can be considered to be the central plane of the tension-resisting first ply portion 72 although it can be elevationally displaced therefrom. By making some basic assumptions and relatively crude simplifications, one approximation formula for the shear stress in a bias ply portion is:

$$SS = -M \cdot \frac{1}{4}(\sin 2B + \frac{1}{2} \sin 4B) \cdot R \cdot A \cdot STR \div PT$$

Where:
SS = shear stress in MPa (psi) for a single layer
M = elastic modulus of a cable in MPa (psi)
B = bias angle in degrees, including sign (+ or −), of a cable from mid-circumferential plane
R = number of cables in a unit of belt width divided by the unit of belt width —No./mm (No./″)
A = Area of a cable in mm$^2$ (inches$^2$)
STR = strain in mm/mm (″/″) from a single layer
PT = ply thickness in mm(″)

Since the only layers of the belt 24 that develop side shear forces are the second and third ply portions 74 and 76, because the cables 82 and 106 of the other layers are at 0° and 90° respectively, this equation can be used for each of these ply portions. Since it is desired to have $SS_+ + SS_- = 0$, the equations for the shear stresses in each layer are summed and made equal to zero.

By using the same construction of the cables 90 and 98 and the same number of cables per unit of width, by making a rough approximation that the strain of the third ply portion 76 is some specific multiple of the second ply portion 74, for example two times, and by selecting a convenient cable angle A of +45° for the second ply portion 74 the equations can be solved to yield an angle B of −58°. Since this is relatively close to −60°, the 60° angle can be used for manufacturing convenience. This method of choosing angled plies should provide the desired belt stiffness while minimizing lateral drifting of the drive belt during bending thereof in use.

The shear stress equations noted above can be used for mathematically determining the differences in the first alternate embodiment of FIG. 9 after alternatively assuming the same angles A and B but of opposite sign for each of the ply portions 74 and 76′, the same construction of the individual cables 90 and 98, and by selecting a particular number of cables per unit of width of the belt 24′ for the second ply portion 74. This yields a solution that provides a lesser number of cables for the third ply portion 76′. In one example, if 45° angles are chosen for angles A and B, and a cable density of 2.76 ends per cm (7.0 ends per inch) is chosen for the second ply portion, then a cable density of 1.38 ends per cm (3.5 ends per inch) is dictated by the solution of the above noted equations for the third ply portion.

While the drive belt 24 requires one substantially 0° ply portion 72 for sustaining tension loads and two bias ply portions 74 and 76 for providing the desired stiffness characteristics, three serially arranged bias ply portions can be incorporated with the shear stress in each layer being calculated by the approximation equation noted above and the shear stresses summed and made equal to zero. One drive belt 24 that exhibited minimum lateral shifting in use included a radially inner bias ply portion 74 having a plurality of cables 90 at an angle of +45° and a density level of 2.76 ends per cm (7.0 ends per inch), an intermediate bias ply portion 76 having a plurality of cables 98 at an angle of −45° and a density level of 5.52 ends per cm (14.0 ends per inch), and a radially outer bias ply portion, not illustrated, having a plurality of cables at an angle of +45° and a density level of 2.76 ends per cm (7.0 ends per inch) and being basically similar in construction to the radially inner bias ply portion 74. Since one or two substantially 90° ply portions 78 and/or 112 are also highly desirable, such extra bias ply portion is not preferred because the added complexity is costly and the service life of the drive belt tends to decrease when too many layers of reinforcement are used.

Although I prefer to locate the bias ply portions 74 and 76 radially outwardly of the tension-resisting first ply portion 72 as is illustrated in the drawings, I also contemplate that they may be located radially inwardly thereof and the shear stresses neutralized in the manner set forth above. Furthermore, although only steel cables have been described in the embodiments of the present invention and are currently preferred, I contemplate that other metallic and nonmetallic materials having a relatively high Young's Modulus may be used for the individual filaments without departing from the spirit of the present invention.

I further contemplate that the wheel structures 18 and 20 need not have central guide channels 38 or 28. Specifically, the drive belt 24 of the present invention could have integrally associated guide members near the opposite side surfaces 54 and 56 rather than the centrally located guide members 62 previously described.

Accordingly, it can be appreciated that the drive belt 24 of the present invention has an inner tension-resisting first ply portion 72 of substantially 0° cable form, and juxtaposed bias ply portions 74 and 76 that are individually constructed specifically to neutralize the shear stresses of each in order to minimize the tendency of the belt to shift laterally when bending and when subjected to relatively high tension loads and/or high vehicle running speeds. By using the fact that these bias ply portions must conform to the deformation thereof generally away from the first ply portion while bending about the wheel structures 18 and 20 and the relatively rough mathematical approach noted above, the belt can have the bias ply portions constructed to provide the desired stiffnesses for a given operating circumstance. This will allow a predetermined amount of pantographing action of the overlapping cables 90 and 98 during unequal stretching of the bias ply portions, while simultaneously minimizing snaking motion of the drive belt when the vehicle is operated over uneven terrain, under adverse footing conditions, or when steering. The interior surface 50 of the belt is smooth, flat and of elastomeric or rubber material so as to facilitate its frictional engagement with the preferably relatively rigid cylindrical surfaces 26 and 36 of the wheel structures, which are also preferably made of elastomeric or rubber material. The drive belt 24 can be considered to be substantially inextensible from the standpoint that its ultimate elongation is less than about 2% or 3%.

Other aspects, objects, and advantages of this invention can be obtained from a study of the drawings, the disclosure, and the appended claims.

I claim:

1. An endless elastomeric drive belt comprising:
   an endless body having an interior surface and a longitudinal first plane therethrough;
   a first ply portion in the body having first cable means for sustaining tension loads and including at least one relatively inextensible cable oriented in substantially parallel relation to the first plane, the first cable means defining a second plane substantially contiguous therewith parallel to the interior surface;
   a second ply portion in the body having second cable means for increasing the longitudinal, transverse and oblique stiffness of the drive belt and including a plurality of second cables arranged at a positive bias angle to the first plane and defining in use a first shear stress and first strain level; and
   a third ply portion in the body having third cable means for increasing the longitudinal, transverse and oblique stiffness of the drive belt and including a plurality of third cables arranged at a negative bias angle to the first plane and defining in use a second shear stress and second strain level, the second and third ply portions being differently constructed so as to substantially neutralize the first and second shear stresses generated from tensile loading of the belt while bending by apportioning the first and second strain levels in approximate proportion to the distance of the second and third cable means from the second plane.

2. The drive belt of claim 1 wherein the second cables are arranged at a first bias angle A relative to the first plane and the third cables are arranged at a second bias angle B larger in magnitude than the angle A.

3. The drive belt of claim 2 wherein the angle A is approximately +45° and the angle B is approximately −60°.

4. The drive belt of claim 1 wherein the second cables and third cables are identical in individual construction and of steel material.

5. The drive belt of claim 4 wherein the number of second cables per unit of width of the belt is equal to the number of third cables per unit of width, the second cables are arranged at an angle of approximately +45°, and the third cables are arranged at an angle of approximately −60° to the first plane.

6. The drive belt of claim 4 wherein the number of third cables per unit of width of the belt is less than the number of second cables per unit of width.

7. The drive belt of claim 4 wherein the second cables are arranged at different angle to the first plane than the third cables.

8. The drive belt of claim 1 wherein the belt is of a construction sufficient for propelling a vehicle while being disposed in an encompassing relationship with a pair of substantially cylindrical wheel structures, and has a tension sustaining capability in a range of from about 10,000 to 40,000 Newtons per lateral centimeter of belt width.

9. An endless elastomeric drive belt comprising:
   an endless body defining an interior surface and having a mid-circumferential plane therethrough;
   a first ply portion in the body having first cable means for carrying substantially all of the tensile working load of the drive belt and including at least one relatively inextensible steel cable circumferentially oriented substantially parallel to the plane outwardly of the interior surface;
   a seciond ply portion in the body outwardly of the first ply portion and having a second cable means for increasing the stiffness of the drive belt and including a plurality of second steel cables oriented at a preselected angle A to the plane; and
   a third ply portion in the body outwardly of the second ply portion and having third cable means for increasing the stiffness of the drive belt and including a plurality of third steel cables oriented at a preselected angle B greater than the angle A and of an opposite sign relative to the plane sufficient for substantially neutralizing the shear stresses generated from tensile loading and minimizing lateral shifting of the belt in use.

10. The drive belt of claim 9 including a fourth ply portion in the body and located outwardly of the third ply portion and including a plurality of fourth steel cables oriented at about 90° to the plane.

11. The drive belt of claim 9 wherein the body includes an exterior surface parallel to the interior surface, opposite sides to define a substantially rectangular cross sectional configuration, a plurality of integrally formed cleats extending outwardly from the exterior surface, and a plurality of integrally formed and longitudinally spaced apart guide members extending inwardly from the interior surface.

12. The drive belt of claim 9 wherein the belt is capable of sustaining tension loads in a preferred range of about 20,000 to 32,000 Newtons per lateral centimeter of belt width.

13. An endless elastomeric drive belt comprising:
   an endless body of closed loop construction having a mid-circumferential plane therethrough;
   a first ply portion including at least one relatively inextensible first steel cable in the body oriented in substantially parallel relation to the plane and carrying substantially all of the tensile working load of the drive belt;
   a second ply portion including a plurality of parallel second steel cables in the body radially outwardly of the first ply portion arranged at a positive bias angle to the plane; and
   a third ply portion including a plurality of parallel third steel cables in the body radially outwardly of the second ply portion arranged at a negative bias angle to the plane with an angular magnitude greater than that of the second ply portion in order to substantially neutralize the shear forces generated from tensile loading of the belt while bending.

14. An endless elastomeric drive belt for use on a vehicle having a pair of longitudinally spaced and substantially cylindrical wheel structures comprising:
   an endless body entrained about the wheel structures and having an interior surface, an exterior surface, and opposite side surfaces to define a generally continuous rectangular cross section, and a mid-circumferential first plane therethrough;
   a first ply portion in the body having first cable means for sustaining tension loads including at least one relatively inextensible first steel cable oriented in substantially parallel relation to the first plane, the first cable means defining a second plane substantially contiguous therewith parallel to the interior surface;

a second ply portion in the body having second cable means including a plurality of second steel cables arranged at a positive bias angle to the first plane and defining in use a first shear stress and first strain level; and a third ply portion in the body having third cable means including a plurality of third steel cables arranged at a negative bias angle to the first plane and defining in use a secons shear stress and second strain level, the second and third ply portions being differently constructed so as to substantially neutralize the first and second shear stresses generated from tensile loading of the belt while bending about the wheel structures by apportioning the first and second strain levels in approximate proportion to the distance of the second and third cable means from the second plane.

15. An endless elastomeric drive belt comprising:

an endless body having an interior surface and a longitudinal first plane therethrough;

a first ply portion in the body having first cable means for sustaining tension loads and including at least one relatively inextensible cable oriented in substantially parallel relation to the first plane, the first cable means defining a second plane substantially contiguous therewith parallel to the interior surface; and at least two bias ply portions in the body outwardly of the first ply portion and individually having therein other cable means for increasing the longitudinal, transverse and oblique stiffness of the drive belt and including a plurality of parallel cables, each of the other cable means arranged in biased angle relationship to the first plane, at least one of the other cable means being of opposite angle than the remaining other cable means, the bias ply portions being so constructed and arranged that the individual shear stresses generated therein from tensile loading of the belt, while bending, are summed to be substantially equal to zero by apportioning the individual strain levels of the bias ply portions in approximate proportion to the distances of the respective other cable means from the second plane to thereby minimize lateral side shifting of the belt in use.

16. The drive belt of claim 15 including another ply portion in the body having a plurality of parallel cables oriented at about 90° to the first plane.

* * * * *